Patented July 2, 1935

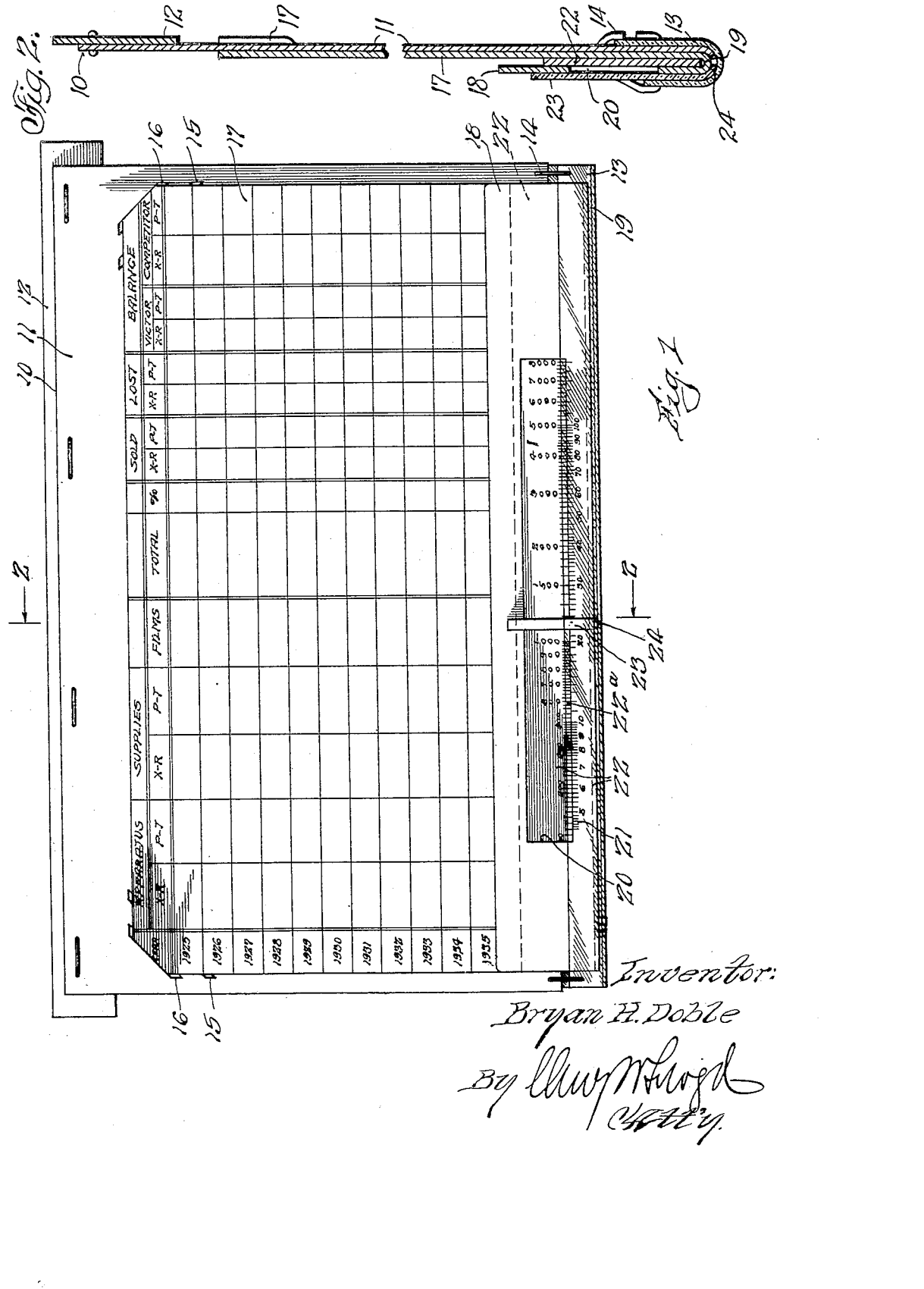

2,006,945

UNITED STATES PATENT OFFICE 2,006,945

FILE INDICATOR

Bryan H. Doble, Chicago, Ill.

Application October 17, 1932, Serial No. 638,139

1 Claim. (Cl. 129—16.7)

The present invention has to do with a record card and relates particularly to the provision of mechanical means for calculating and maintaining a visible record of percentages or the like in respect to an arbitrary figure, say, a sales quota.

There may be many uses for the present device other than in connection with a sales record, but for the purpose of illustration, the invention is shown as applied to a sales data card.

In sales work, it is usual to assign to each salesman or office or district a volume of sales to be made. This amount is generally called the "Sales quota." An active sales manager or executive always keeps in touch with the progress of his sales force or offices. The more complete his knowledge of his salesmen's activities, the better able is the sales manager to urge greater effort on the part of the delinquents, if any. It is extremely important that he has instantly available accurate statistical data or records showing each salesman's accomplishment with reference to his sales quota. It is, however, somewhat of a laborious task to calculate such percentages daily, weekly, or even monthly. Especially is this true in the case of large organizations. A manager knows from a knowledge of what each man is doing or has done over a period of time how to help the persons who are falling behind and how to direct the efforts of the units of his force.

If the sales manager's records are several days or a week in arrears, information as to the shortcomings or the lack of success of one or more of his salesmen may not be brought to him in time to bolster the man's efforts with the result that the volume of sales demanded of the sales manager may not be had over a selected time interval, with a resulting embarrassment to the sales manager in his dealings with the higher executives of his organization.

Where a sales maanger has a large number of employees under his control, it is almost impossible to keep the individual sales records of each man up to the minute. To calculate the percentage of the current sales to the quota after each reported sale would be an endless task upon which most executives would frown even though the results might be instantly apparent.

For the purpose of making it unnecessary to calculate these percentages but to have them instantly available at all times, the present invention was conceived. The objects of the invention include the provision of new and novel means for obtaining statistical data, a unique means for keeping track of changing figures while maintaining an accurate index of their relation to some arbitrary figure, and an improved record card.

These objects, and such other objects as may hereinafter appear, are obtained by the novel construction, unique arrangement, and changed combination of the several elements illustrated in the single sheet of drawing attached hereto, in which one form of the invention is shown, and in which:

Figure 1 is a plan view of one type of card upon which the invention may be practiced; and Figure 2 is an an end view or section to the line 2-2 of Figure 1.

Like reference characters are used to designate similar parts in the drawing and in the description of the invention hereinafter given.

In the drawing is shown a file holder 10 which is not a part of the present invention but with which the invention may be conveniently assembled. The file holder 10 comprises a card 11 which is usually of a strong fibrous material and to the top of which is stapled or otherwise fastened a strip 12. Depending from the lower edge of the card 11 is a channel member 13, which may be of any material such as celluloid, or the channel 13 may be of any suitable transparent material. The channel member 13 is usually coextensive with the bottom edge of a card 11 in such a file holder 10. In the present case, staples 14 are employed for holding the U-shaped member 13 to the bottom of the card 11. Within the upper corners of the card 11 will be noted angularly arranged slits 15 and 16. The card 11 may be provided with more such slits 15 or 16 than are illustrated in the drawing.

Having thus described one form of holder, the invention will now be described. The invention consists of a card 17 which may be of a heavy bond paper or even a light grade of a cardboard material if desired. The card 17 is shown bearing columns and numbers, and other indicia designating the columns but such indicia are for purposes of illustration only and it is proposed that the card 17 may be prepared blank as well as with columns.

The lower margin 18 of the card 17 is retroflexed at 19 to be carried upwardly alongside of the main body of the card. Within the upturned margin 18 is a window 20. Along the lower edge of the window 20 is printed a logarithmic scale 21. The scale 21 reads from zero to one hundred and is used for indicating percentages as will be shown later. If desired, the scale 21 may be continued beyond the range of "100". The card 17 is held within the file holder 10 by resting within the channel member 13 and by having the upper corners thereof inserted into any one of a pair of slits 15 or 16 depending upon the size of the card 17.

Slidably contained between the upturned margin 18 and the main body of the card 17 is a strip 22. Usually the strip 22 will be made of a light cardboard. However, any thin body of material capable of receiving printing will suffice. Printed upon the strip 22 is a second logarithmic scale 22a which is complemental to the scale 21 upon the lower edge of the window 20. An indicating piece 23 is shown disposed vertically within the channel member 13 and in a manner free to be slid along the length of the channel past the scales 21 and 22a. The lower end of the narrow indicating strip 23 may be curved at 24 so that it will project beneath the lower edge of the card 17 in order that its upright position will be maintained. If desired, the strip 23 may be of a transparent material. Indicating strip 23 may be propelled along the scales 21 and 22a by means of a pencil point or by grasping its upper extremity with the finger tips.

In use, the selected amount of a quota is designated upon the upper scale 22a. The strip 22 is then slid into a position to place such selected quota opposite to the numeral 100 upon the lower and stationary logarithmic scale. In the present case, the quota selected has been 5,000, the numeral 5,000 being shown opposite to the numeral 100. The problem to be solved or calculated by the present device is to determine the percentage of the full quota which any quantity of units sold constitutes. For instance, by referring to the scales as set in Figure 1, where the quota is 5,000, there might be sold 1,000 of the units. 1,000 is opposite to 20 on the lower scale, which means that 1,000 units sold is twenty per cent of 5,000 or the whole quota. The example taken is very simple and one which may be readily calculated in the mind. However, the device will indicate with equal efficacy percentages which are not aliquot of the ultimate objective.

The narrow indicating member 23 is used for indicating at all times the change in percentage of units sold. When, for instance, a sales campaign has been started and a sales quota has been determined for a certain salesman, that quota may be set off on the scale 22a of that particular salesman's card 17 and opposite to the numeral 100 on the lower scale. Then the indicating member 23 will be moved to the left edge of the window 20. Each time that a report is received of the number of units sold by the particular salesman for whom the device is an indicator, the indicating member 23 will be advanced to a position on the upper scale 22 corresponding to that report, and at a glance the percentage which is pointed off on the lower scale 21 by the indicating member 23 may be discerned.

The sales manager, or anyone else interested in knowing what any particular salesman is doing, has merely to look at the salesman's card, and there is before him all of the data which he wishes to learn—how much the particular salesman has sold; how such amount stands in relation to the volume such salesman should have sold, and the like. A sales manager may, on the tenth day of any month, examine the records of his sales force and tell instantly how many thereof have sold thirty-three and one-third per cent of the quota assigned for that month. Immediately, he may apply corrective or stimulative measures as the case demands.

The present device is for use with any type of visible record system. When it is desired that printing be upon the card 17 such printing may be arranged for concurrently with the sale of the device to a user so that his particular requirement can be fulfilled. A multiple of differently ruled cards may be carried in stock by a vendor of the device, the rulings being of designs commonly used and with columns which may be better indexed by the user to keep pace with his changing needs.

What is claimed as new and is desired to be secured by Letters Patent of the United States is:

An index device comprising a holder and a card secured at its upper end thereto and having a section which is doubled back against the remainder of itself, said doubled back section having an opening therein, a strip between said doubled back section and the remainder of said card, a movable pointer extending from a point below said strip and the part of said doubled back section below said opening and extending over said doubled back section to a point above said opening, transparent holding means U-shaped in cross section partially about said card, said doubled back section, said strip, and said pointer, fastening means joining said holding means and said holder, said doubled back section bearing an index scale below said opening and underneath said transparent holding means, said strip bearing a second index scale visible through said opening and being adjustable to move said second scale relative to a selected point on said first scale to indicate a selected quantity on said second scale, and said pointer being adjustable with relation to said first scale and said second scale to indicate simultaneously a selected quantity on said second scale and a quantity on said first scale.

BRYAN H. DOBLE.